Figure 1:
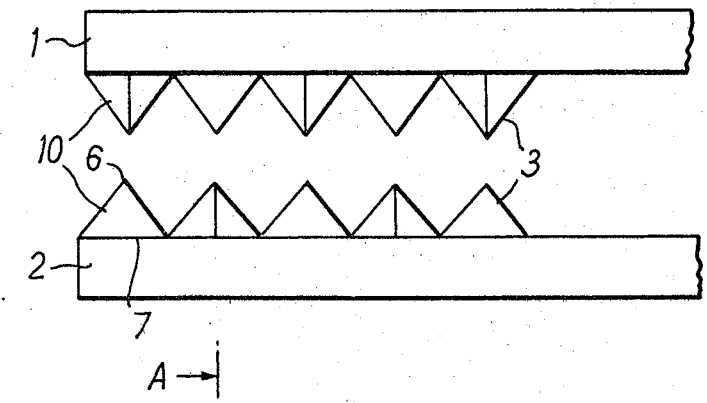
Figure 2:
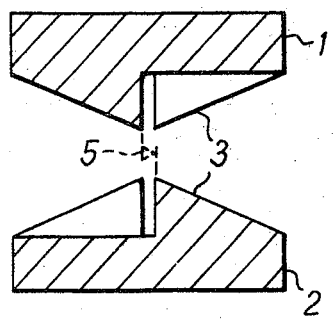
Figure 3:
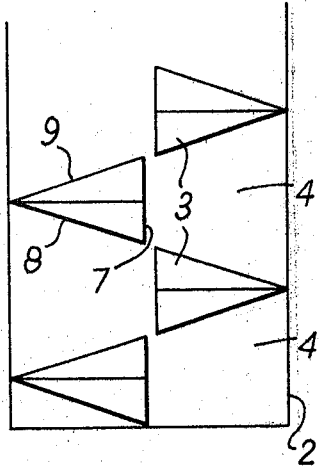

United States Patent [19]
Shadwell

[11] 3,879,813
[45] Apr. 29, 1975

[54] CLAMP

[75] Inventor: David William Shadwell, Macclesfield, England

[73] Assignee: Imperial Chemical Industries Limited, London, England

[22] Filed: Jan. 4, 1974

[21] Appl. No.: 430,625

[30] Foreign Application Priority Data
Feb. 8, 1973 United Kingdom.................. 6184/73

[52] U.S. Cl............................................. 24/243 GC
[51] Int. Cl.............................................. A44b 21/00
[58] Field of Search ........... 128/346, 321, 322, 325, 128/354; 24/DIG. 22, 263 DT, 243 GC, 243 FS, 248 BB, 248 GC, 137 A

[56] References Cited
UNITED STATES PATENTS
2,108,325  2/1938  Ziegler............................... 128/346
2,686,520  8/1954  Jarvis et al.......................... 128/346
3,503,398  3/1970  Fogarty et al................... 128/322 X
3,604,071  9/1971  Reimels ........................... 128/346 X
3,815,607  6/1974  Chester.............................. 128/354

FOREIGN PATENTS OR APPLICATIONS
651,186  3/1951  United Kingdom............... 24/137 A

*Primary Examiner*—Donald A. Griffin
*Attorney, Agent, or Firm*—Cushman, Darby & Cushman

[57] ABSTRACT

A clamp for gripping fabric which has jaws including sharp teeth arranged in longitudinal rows with gaps between the teeth, the teeth in one row being offset with respect to the teeth in an adjacent row and the teeth in one jaw meshing into the gaps in the other jaw.

3 Claims, 3 Drawing Figures

PATENTED APR 29 1975 3,879,813

CLAMP

This invention relates to a clamp and in particular it relates to a clamp having jaws with an improved design of teeth suitable for use in gripping relatively soft material, for example fabric.

The design of teeth usually found on a pair of pliers or a clamp consists of transverse ridges on each jaw which mesh crest to root. For many purposes, such teeth are entirely satisfactory, but in certain applications, for example in securing together towels used to cover a patient in a hospital operating theatre, it is desirable that the teeth provide a greater resistance to transverse displacement of the material being gripped than that provided by conventional teeth. It is an object of the present invention to provide a design of teeth for holding relatively soft material, for example fabric, which exerts a more secure grip than conventional teeth.

According to the invention there is provided a clamp including a pair of jaws having teeth, provided with an apex sufficiently sharp to penetrate fabric, arranged in at least two longitudinal rows on each jaw, the teeth in any one row being spaced apart by gaps and in transverse register with the gaps between the teeth in adjacent row, and the teeth on each jaw meshing into the gaps between the teeth on the other jaw.

In the context of this specification, a clamp is to be understood as any gripping instrument or tool in which two jaws may be brought together to grip an object.

In a preferred embodiment of the invention, the teeth are in the form of triangular pyramids with one side of the base triangle parallel to the longitudinal axis of the jaw and the apex of the pyramid vertically above that side. Adjacent rows of teeth are then arranged with the vertical faces of the pyramids facing in opposite directions. This arrangement has the advantage that fabric trapped between the jaws resists being displaced transversely by being held against the vertical faces of the teeth.

In order that the invention may be more clearly understood, a preferred embodiment of the clamp will now be described by way of example only with reference to the accompanying drawings of which FIG. I is a vertical elevation of the jaws of a clamp,
FIG. II is a section along the line A—A of FIG. I,
and FIG. III is a plan view of the lower jaw of FIG. I.

The clamp according to the invention is in the form of a towel clamp for use in hospital operating theatres and includes two jaw members 1 and 2 as shown in FIG. I. As shown in FIG. III the lower jaw 2 is provided with two rows of teeth 3 arranged longitudinally along the jaw 2. The teeth 3 in each row are spaced apart to leave gaps 4 and these gaps 4 are in a transverse register with the teeth 3 in the other row. As can be seen from FIGS. I and II, the teeth in jaw 1 mesh with the teeth in jaw 2 so that each tooth 3 enters a gap 4 in the other jaw, leaving a small gap 5 between the transversely opposed teeth from the upper and lower jaws. In the embodiment illustrated, each tooth is formed as a triangular pyramid giving an apex 6 sufficiently sharp to penetrate fabric. The base of the pyramid is an isosceles triangle with sides 7, 8 and 9, having a height approximately 1½ times the base 7. The height of the pyramid is approximately equal to base side 7 and the apex 6 is vertically above the side 7. The pyramid thus provides a vertical triangular face 10 close to, and parallel with, the plane between adjacent rows. The teeth in adjacent rows are arranged with the faces 10 facing in opposite directions (FIG. II). In the preferred embodiment illustrated, the jaw 1 or 2 and its teeth 3 are made from a single piece of plastics material and can be fabricated by one-shot injection moulding.

In operation, when the clamp is used to grip a piece of fabric or to secure together two pieces of fabric, for example hospital operating theatre towels, then the fabric is placed between the jaws 1 and 2 and the jaws brought together. The fabric is pierced by the apices 6 of the teeth and is held firmly in the small gap 5 and against opposed faces 10 of teeth 3 from jaw 1 and jaw 2 respectively, thus resisting transverse stress. The fabric is also gripped in the longitudinal direction of the jaws in a zig-zag manner between the teeth 3 in each of the jaws 1 and 2 and this also assists the improved gripping qualities of the teeth design.

It will be clear from the foregoing that the new clamp is not limited to the precise shape of teeth as shown in the illustrated embodiment. Provided that an apex is formed, the base of the teeth may be any convenient shape, and the apex need not vertically above a point within the base area. However, it is preferred that the apex be near the line dividing adjacent rows of teeth and that the angle at the apex be from 40° to 70°; 60° being about the optimum. Variation in the shape of the teeth 3, of course, will vary the shape of gap 5, and indeed it may even be dispensed with.

When the jaw and teeth are made from a single piece of plastics material, suitable plastics materials are, for example, polypropylene, polypropylene filled with talc or galss fibre, nylon, polyesters, for example polyethylene terephthalate or polytetramethylene terephthalate, polycarbonate or poly(vinyl chloride).

What is claimed is:

1. A clamp for gripping fabric including an upper and a lower jaw, each jaw comprising at least two longitudinal rows of teeth with gaps between the teeth in any one row, said teeth in any one row being in transverse register with said gaps in an adjacent row and each tooth having an apex for penetrating fabric, and in which the teeth in the upper jaw mesh into the gaps between the teeth in the lower jaw and vice versa, each tooth being in the form of a triangular pyramid with one side of the base triangle parallel to the longitudinal axis of the jaw in which it is located and the apex situated vertically above that side to form a vertical face, adjacent rows of teeth being arranged with the vertical faces of the teeth in each row facing in opposite directions.

2. A clamp according to claim 1 wherein the longitudinal rows of teeth are spaced apart by a small gap.

3. A clamp according to claim 1 wherein each jaw has only two longitudinal rows of teeth.

* * * * *